US008530597B2

(12) United States Patent
Kurian et al.

(10) Patent No.: US 8,530,597 B2
(45) Date of Patent: Sep. 10, 2013

(54) HIGH MOLECULAR WEIGHT COMPACT STRUCTURED POLYMERS, METHODS OF MAKING AND USING

(75) Inventors: Pious V. Kurian, Aurora, IL (US); Peter E. Reed, Plainfield, IL (US); Michael R. St. John, Chicago, IL (US); Winston Su, Naperville, IL (US); Jeffrey R. Cramm, Batavia, IL (US)

(73) Assignee: Nalco Company, Naperville (IL)

( * ) Notice: Subject to any disclaimer, the term of this patent is extended or adjusted under 35 U.S.C. 154(b) by 568 days.

(21) Appl. No.: 12/545,539

(22) Filed: Aug. 21, 2009

(65) Prior Publication Data
US 2009/0312512 A1   Dec. 17, 2009

Related U.S. Application Data

(63) Continuation of application No. 11/120,878, filed on May 3, 2005, now abandoned.

(51) Int. Cl.
*C08F 220/56* (2006.01)
(52) U.S. Cl.
USPC ............... 526/303.1; 526/307.2; 526/307.3
(58) Field of Classification Search
USPC ................ 526/303.1, 307.2, 307.3
See application file for complete search history.

(56) References Cited

U.S. PATENT DOCUMENTS

| 3,711,573 | A | | 1/1973 | Nagy |
| 3,728,214 | A | | 4/1973 | Espy |
| 5,627,249 | A | * | 5/1997 | Doki et al. ............ 526/303.1 |
| 6,124,396 | A | | 9/2000 | Hahn et al. |
| 6,429,253 | B1 | | 8/2002 | Guerro et al. |
| 6,617,402 | B2 | | 9/2003 | Hernandez-Barajas et al. |

FOREIGN PATENT DOCUMENTS

| EP | 0 282 081 A1 | 9/1988 |
| JP | 6080737 A | 3/1994 |
| JP | 6157679 A | 6/1994 |
| WO | WO 02053835 A1 | 7/2002 |

OTHER PUBLICATIONS

Y. Ciu; Q. Gao; Y. Jin; C. Liu; J. Zhang; "Inverse Suspension Polymerization of Acrylamide Initiated by Potassium Persulfate and N,N-Dimethylaminoethyl Methacrylate", 27(7), 490-493, 1998 (English Abstract).

* cited by examiner

*Primary Examiner* — Ling Choi
*Assistant Examiner* — Chun-Cheng Wang
(74) *Attorney, Agent, or Firm* — Benjamin E. Carlsen; Andrew D. Sorensen

(57) ABSTRACT

A structured water soluble polymer produced by polymerization of amine-containing monomers or pre-formed polymers is described. Various structured polymers are prepared and characterized. The structured polymers are particularly valued in the papermaking industry.

8 Claims, No Drawings

HIGH MOLECULAR WEIGHT COMPACT STRUCTURED POLYMERS, METHODS OF MAKING AND USING

CROSS REFERENCE TO RELATED APPLICATIONS

This is a continuation of Ser. No. 11/120,878, filed May 30, 2005.

FIELD OF THE INVENTION

The present invention relates to materials and methods for the preparation of high molecular weight compact structured water-soluble polymers. These polymers are particularly useful in the paper making industry.

BACKGROUND OF THE INVENTION

Structured polymers and copolymers have attracted considerable attention over the past decades due to new and improved properties of the resulting polymers. The term "structured" as used herein with respect to synthetic polymers is intended to designate non-linear polymers.

Polymers such as acrylamide polymers have been used throughout the papermaking process as dry strength agents, drainage agents, retention aids, coagulants, dispersants, etc. Dry strength is an important property, which must be met at some minimum level to meet the end use for paper and paperboard products. Acrylamide containing polymers are well known in the paper industry to provide dry strength. Linear acrylamide polymers having a weight-average molecular weight range from about 50,000 to somewhat greater than 5,000,000 have conventionally been used as dry strength agents. Existing acrylamide based commercial examples include acrylic acid (AA)/acrylamide (AcAm) copolymer, glyoxalated diallyldimethylammonium chloride (DADMAC)/AcAm, and an amphoteric polymer composed of AcAm/itaconic acid/dimethylammoniumethylmethacrylate (DMAEM)/dimethylammoniumethylacrylate benzyl chloride quat (DMAEA BCQ). These commercial strength agents suffer from various drawbacks including handling issues, paper machine process issues or inadequate dry strength. Demands in modern paper industry have resulted in need for improved dry strength agents. In addition to allowing papermakers to achieve their product strength specifications, the dry strength additive enables papermakers to reduce basis weight, substitute low cost fiber, increase filler loading, increase machine speeds and modify sheet properties.

SUMMARY OF THE INVENTION

A water-soluble structured polymer having a weight-average molecular weight of from about 100,000 to about 5,000,000 is provided. This polymer is. obtained by polymerizing one or more amine-containing unsaturated monomers or polymers. The polymerization reaction is a reaction mixture of at least one of amine-containing groups comprising ethylenically unsaturated primary, secondary, or tertiary amines and mixtures thereof a preformed polymer comprising a secondary or tertiary amine; and optionally, at least one of acrylamide or methacrylamide. The resulting structured polymer has an apparent conformation coefficient of less than or equal to about 0.40 in sodium nitrate solution, measured at a pH of about 3 and a greater than or equal to about 80% solubility as determined by SEC/MALLS techniques.

A number of water-soluble structured polymers are derived from the polymerization reaction of monomers comprising one or more amine-containing groups. A high molecular weight water-soluble structured polymer is obtained from polymerizing one or more ethylenically unsaturated amine monomers. A non-acrylamide based terpolymer was obtained from copolymer components of monoallylamine (MAA), diallyamine (DAA), and triallylamine (TAA) and mixtures thereof.

An acrylamide based high molecular weight water-soluble structured polymer is provided from polymerization of acrylamide and one or more of ethylenically unsaturated amine monomers. For example, a reaction mixture may contain acrylamide (AcAm) and dimethylaminoethylmethacrylate (DMAEM) resulting in structured AcAm/DMAEM copolymers.

Polymer components comprising a pre-formed polymer to which acrylamide has been grafted result in another type of structured polymner. Pre-formed polymers, include, but not limited to, poly(amidoamine) or diallyldimethylammonium chloride (DADMAC)/dimethylaminopropyl methacrylamide (DMAPMA) copolymer.

The structured polymers are useful as improved dry strength additive for papermaking process. The characteristics of dry strength structured polymers are identified by:
 a) a weight-average molecular weight of from about 100,000 to about 5,000,000;
 b) an apparent conformation coefficient of less than or equal to about 0.40 in sodium nitrate solution having a pH of about 3; and
 c) a greater than or equal to about 80% solubility as determined by SEC/MALLS technique.

Dry strength agents include, but are not limited to, co-monomers of (a) acrylamide; and (b) one or more ethylenically unsaturated monomers. Monomers including but not limited to dimethylaminoethylmethacrylate (DMAEM), dimethylaminoethylacrylate (DMAEA), dimethylaminopropyl methacrylamide (DMAPMA), and dimethylaminopropyl acrylamide (DMAPAA) and salts thereof.

DETAILED DESCRIPTION OF THE INVENTION

A. Definitions
As used herein, the terms set forth below are meant to designate the following:

"About" is equal to, greater or less than 2 digital units on either side of the reference number.

"Structured polymer" refers to a compact non-linear polymer with controlled branching as prepared by the polymerization process disclosed herein, the structure of which includes any deviation from linearity in the backbone polymer chain.

"An ethylenically unsaturated primary, secondary, or tertiary amine" refers to amine containing compounds having carbon-carbon double bonds that are reactive towards free radical polymerization.

"Monomer" refers to a polymerizable allylic, vinylic or acrylic compound.

"A pre-formed polymer comprising a secondary or tertiary amine" is a polymer backbone containing amine groups.

"Weight-average molecular weight" refers to the molecular weight average of polymer determined by static light scattering measurement, specifically by Size-Exclusion-Chromatography/Multi-Angle-Laser-Light-Scattering (SEC/MALLS) technique. The instant structured polymer has a weight-average molecular weight of from about 100,000 to about 5,000,000.

"Apparent conformation coefficient" is defined by the slope of the double logarithmic plot (root-mean-square-radius versus molecular weight of polymer) obtained from the ASTRA software (Wyatt Technology), specifically the top 20% of molecular weight distribution of polymer eluted from SEC columns is calculated.

"SEC" refers to Size-Exclusion-Chromatography that is a chromatography technique for polymer separation based on hydrodynamic volume of polymer.

"MALLS" refers to Multi-Angle-Laser-Light-Scattering instrument (DAWN DSP-F) provided by Wyatt Technology "Improved dry strength additive" refers to the compact structured acrylamide polymer preferably containing acrylamide and/or methacrylamide in a proportion of 50 mole % or more, preferably 75-99 mole %, and especially 85-95 mole % which when added to the papermaking process increases dry strength by about 5%.

"Batch addition" refers to a chemical addition process in which all the reaction components are added to the reactor before the reaction commences and then held under controlled conditions until the desired endpoint is reached.

"Semi-batch" refers to as a chemical process in which one or more of the reaction components are added (in part or in whole) after the reaction commences. A "semi-batch addition" refers to the reaction component that is added over the course of the reaction.

"Oxidant" refers to polymerization imtiators including, but not limited to, persulfate and peroxide types, ammonium persulfate, potassium persulfate, sodium persulfate, hydrogen peroxide, tert-butylhydroperoxide benzoyl peroxide and tert-butyl peroxide.

B. Characterization of Monomers

One or more primary, secondary or tertiary amine-containing monomers provide the structured polymers of the invention. Specific examples of monomers providing structured polymers include amines such as N,N-dimethylaminoethyl methacrylate, N,N-diethylaminoethyl methacrylate, N,N-dimethylaminoethyl acrylate, N,N-dimethylaiminopropyl methacrylamide, and N,N-dimethylaminopropylacrylamide, vinylamine, monoallylamine, (MAA) diallylamine and triallylamine and salts thereof.

The ethylenically unsaturated monomers employed in this invention may further include anionic, non-ionic, cationic, hydrophobic and hydrophilic types.

Exemplary anionic monomers include unsaturated carboxylic acids such as acrylic acid, methacrylic acid, itaconic acid, maleic acid and fumaric acid, and salts thereof, and vinylsulfonic acid, styrenesulfonic acid and acrylamidomethylpropanesulfonic acid, and salts thereof.

Examples of non-ionic monomers include, but are not limited to, acrylamide, methacrylamide, N-vinylmethylacetamide, N-vinyl methyl formamide, vinyl formamide, vinyl acetate, vinyl pyrrolidone, methyl methacrylate, methacrylic esters, other acrylic or ethylenically unsaturated esters, styrene, and acrylonitrile.

Illustrative examples of cationic monomers include quaternary amines salts such as N,N-dimethylaminoethyl methacrylate, N,N-diethylaminoethyl methacrylate, N,N-dimethylaminoethyl acrylate, N,N-dimethylaminopropyl methacrylamide, and N,N-dimethylaminopropylacrylamide; and salts thereof (including quaternary salts). Examples of quaternary salts include dimethyldiallyammonium chloride and dimethyl aminoethyl acrylate methyl chloride quat.

Exemplary hydrophobic monomers include N-alkyl (meth)acrylamide derivatives such as N,N-di-n-propylacrylamide, N-n-butylacrylamide, N-n-hexylacrylamide, N-n-hexylmethacrylamide, N-n-octylacrylamide, N-n-octylmethacrylamide, N-tert-octylacrylamide, N-dodecylacrylamide, and N-n-dodecylmethacrylamide; N-(.omega.-glycidoxyalkyl) (meth)acrylamide derivatives such as N,N-diglycidylacrylamide, N,N-diglycidylmethacrylamide, N-(4-glycidoxybutyl)acrylamide, N-(4-glycidoxybutyl)methacrylamide, N-(5-glycidoxypentyl) acrylamide, and N(6-glycidoxyhexyl)acrylamide; (meth) acrylate derivatives such as methyl (meth)acrylate, ethyl (meth)-acrylate, butyl (meth)acrylate, lauryl (meth)acrylate, 2-ethylhexyl (meth)acrylate, and glycidyl (meth)acrylate; olefins such as acrylonitrile, methacrylonitrile, vinyl acetate, vinyl chloride, vinylidene chloride, ethylene, propylene, and butene; styrene; .alpha.-methylstyrene; butadiene; and isoprene Illustrative examples of hydrophilic monomers include acetoneacrylamide, N,N-dimethylacrylamide, N,N-dimethyhnethacrylamide, N-ethylmethacrylamide, N-ethylacrylamide, N,N-diethylacrylamide, N-propylacrylamide, N-acryloylpyrrolidine, N-acryloylpiperidine, N-acryloylmorpholine, hydroxyethyl methacrylate, hydroxyethyl acrylate, hydroxypropyl methacrylate, hydroxypropyl acrylate, various methoxypolyethylene glycol (meth)acrylates, and N-vinyl-2-pyrrolidone.

One or more of the above monomers may be used in the process for preparing the polymer of this invention. For example one acrylamide based monomer is used as monomer to prepare a water soluble structured polymer. For example, a cationic monomer reaction mixture may contain acrylamide and dialkylaminoalkyl acrylate (as acid salt or quaternary salt) with dialkylaminoalkyl acrylate. An anionic monomer containing system can include acrylamide and acrylic acid monomer along with amine monomer needed to provide structure.

C. Characteristics of the Structured Polymers

The structured polymers of this invention exhibit a high molecular weight, a compact solution structure, and a high water-solubility due to the introduction of branches accomplished by the urique polymerization process.

The advantages of the instant structured polymer of this invention are reflected in the apparent conformation coefficient, solubility and high molecular weight as determined by SEC/MALLS technique. A low value of the apparent conformation coefficient is indicative of 3-dimensional structuring while the good polymer recovery indicates that the structuring has not led to gel-like structures, which are less active. The apparent conformation coefficient is determined from SEC/MALLS measurements using the top 20% of the molecular weight distribution. The slope of the conformation plot defines the apparent conformation coefficient and differentiates structured polymers from linear polymers. The ability of the polymers to elute from SEC column is indicative of polymer solubility in dilute solution. Polymers structured through too much cross-linking or branching have a tendency to form insoluble fractions, and these fractions do not pass through the SEC column under the conditions. The specialized polymerization conditions employed does not introduce a crosslinking agent to produce the polymers of the instant invention, and this is thought to allow the polymers to display high water-solubility along with a high molecular weight, compact structure. The instantly claimed structured polymers are characterized by an apparent conformation coefficient of less than or equal to about 0.4 and concurrent solubility greater than or equal to about 80% as measured by SEC/MALLS technique. Exemplary apparent conformation coefficients less than about 0.4 or less with about greater than 90% are exhibited by the majority of the resulting polymers. For example, a structured AcAm/DMAEM (90/10 mole ratio)

copolymer exhibits an apparent conformation coefficient of about 0.3, 100% recovery, 1,000,000 weight-average molecular weight as determined by SEC/MALLS technique.

Acrylamide copolymers were polymerized with DMAEM and DMAPMA under conditions expected to provide branching from alkyl group attached to the amine. Illustrative structured cationic copolymers AcAm/DMAEM (90/10), AcAm/DMAPMA (90/10), DMAPAA/AcAm/MAA(monoallyl amine) and DMAPMA/DMAPAA/AcAm/MAA exhibited apparent conformation coefficients less than about 0.4 and greater than 90% SEC recovery.

D. Structure Determination

The unique three-dimensional structure of polymers as described in "examples" was determined by a size-exclusion chromatography/multi-angle laser light scattering (or SEC/MALLS) technique. Size exclusion chromatography (SEC) was performed by using a series of TSK-GEL PW columns from TOSOH BIOSCIENCE, a multi-angle laser light scattering detector (MALLS, model: DAWN DSP-F) and an interferometric refractometer (OPTILAP DSP) from Wyatt Technology. The aqueous mobile phase contained 0.1 molar sodium nitrate, phosphate buffer solution (pH 3) and a small amount of sodium azide. Data collection and analysis were performed with ASTRA software from Wyatt Technology. A Debye model and a $3^{rd}$ order detector fit method were employed in data analysis.

The ability of SEC/MALLS technique to determine molecular weight and size of polymer at each elution volume slice is of great important for the determination of polymer conformation. An apparent conformation coefficient is defined by the slope of the double logarithmic plot of root-mean-square radius versus molecular weight of polymer. A typical linear random-coil polymer in a good solvent has a value between 0.5 and 0.6 (ref: P. J. Wyatt, *"Review: Light scattering and the absolute characterization of macromolecules," Analytica Chimica Acta*, 272 (1993)). A three-dimensional structured polymer is obtained when the apparent conformation coefficient deviates from that measured for a linear polymer. For example, the value of a branched polymer is lower than 0.5 because of compact structure. The apparent conformation coefficient of polymers as described in "examples" was determined from top 20% of molecular weight distribution. All of the samples for SEC/MALLS analysis were pre-filtered with a syringe filter (Acrodisc® from PALL, pore size: 1.2 µm, diameter: 25 mm) to protect columns. The solubility of polymer is determined from polymer recovery that is the percentage of polymer eluted from SEC columns.

E. Polymerization Process Characterization

The structured polymers are prepared by an aqueous polymerization reaction employing a redox reaction between the amine of the amine-containing monomer and an oxidizing initiator. As a polymerization process for the acrylamide polymer in the present invention, radical polymerization is preferred. As a polymerization solvent, a polar solvent such as water, an alcohol or dimethylformamide is preferred. Aqueous solution polymerization is however preferred when the acrylamide polymer is used as a paper strength agent. In the case of aqueous water polymerization, an organic solvent such as an alcohol can be used in combination to such an extent that the dispersibility would not be impaired by deposition or precipitation of the polymer The polymerization of the acrylamide polymer in the present invention can be conducted by such a batch process that all the monomers are charged at once in a reaction vessel and are then polymerized. To obtain an aqueous solution having a high concentration of 22% or more, it is however more desired to conduct the polymerization by such a semi-batch process that the polymerization is conducted while adding dropwise a portion of or the entire portion of the monomers. This semi-batch polymerization process makes it possible not only to facilitate removal of polymerization heat from a solution containing monomers at high concentrations but also to control the molecular structure, for example, to facilitate the formation of the polymer into a uniform branched and compact structure.

No particular limitation is imposed on the polymerization initiator-as long as it is an oxidant. A water-soluble polymerization initiator is preferred. The polymerization initiator can be added either at once or dropwise to the aqueous solution of the monomers. Specific examples of the polymerization initiator include, as persulfate and peroxide types, ammonium persulfate, potassium persulfate, sodium persulfate, hydrogen peroxide, benzoyl peroxide and tert-butyl peroxide.

To achieve the desired compact structure of the claimed polymers, the polymerization process comprises initiating an aqueous solution of minimum of about 1 mole % amine monomer and any other co-monomers with a minimum of about 1 mole % (based on total moles of monomer(s)) of oxidant, such as persulfate. During polymerization, the reaction temperature below about 60 C with a pH of about 4 or above provides optimal results.

Optionally, crosslinking is controlled by adding a suitable chain transfer agent (during or after polymerization), or by reducing the pH below about 3 after most of the monomers have polymerized.

A polymer useful as a dry strength agent is prepared with the general process described above, except acrylamide is the predominant co-monomer. In addition, the weight average MW of the polymer must be >100,000 g/mol. Enhanced dry strength effects were obtained from polymers prepared from semi-batch addition of the amine monomer during polymerization. The other factors enhancing performance of the resulting polymer may include the use of monomer, which may dictate the need for semi-batch addition versus batch addition over the course of polymerization.

F. Activity Characterization

The polymers and aqueous solutions so obtained can exhibit various excellent effects as paper strength agents. Use of the acrylamide polymers according to the present invention as paper strength agents is described in further detail.

Dry strength was evaluated using standard procedures for handsheet making and testing. The paper stock used was 80/20 wt % of unrefined bleached hardwood Kraft dry lap and unrefined bleached softwood kraft dry lap. Dry lap furnish was diluted with tap water of pH=7.9, conductivity=267 microS/cm. Treatment of the stock prior to sheet making included the addition of dry strength agent for two minutes followed by addition of a cationic retention aid.

Handsheet making was conducted with a Noble & Woods handsheet former utilizing a single nip felted press and drum dried to bone dry conditions. Sheet strength was evaluated as tensile index, STFI index, and burst ratio using TAPPI standard methods. Sheet (basis) weights and apparent sheet densities (calculated from caliper and basis weight) were evaluated as check on the sheet making procedure and to ensure that strength comparisons were made at equal apparent sheet densities.

EXAMPLES

The foregoing may be better understood by reference to the following examples, which are presented for purposes of illustration and are not intended to limit the scope of this invention.

Example 1

Synthesis of Structured AcAm/DMAEM with Semi-Batch Addition of Amine Monomer

Synthesis was carried out in a standard 1500 mL laboratory reactor equipped with a stainless steel stirring assembly (a half-moon Teflon blade and a non pitched impeller). The reactor was also equipped with heating and cooling capability. 243 g AcAm solution (49.5%) was added to a 1000 mL flask followed by 0.20 g EDTA, 16.36 g DMAEM, 647.84 g distilled water. 4.70 g sulfuric acid was added to adjust the pH to ~7.0. This solution was transferred to the reactor and cooled to 15° C. 7.50 g Sodium persulfate was dissolved in a beaker with 38 g of water and kept on the side. 3.0 g Sodium hypophosphite was dissolved in 12 g of water and placed in a syringe attached to a syringe pump. 14 g DMAEM was placed in a separate syringe attached to a syringe pump. 2.40 g sulfuric acid was dissolved in 11 g distilled water and kept in a beaker. The reaction was initiated with the addition of SPS solution at once and at the same started 2 ml/min addition of DIM and Sodium hypophosphite from the syringe pumps. At the end of reaction (about 6 minutes) the acid solution was added to kill the reaction and stabilize the product.

Example 2

Synthesis of AcAm/DMAEM: Batch Process

Synthesis was carried out in a standard 1500 mL laboratory reactor equipped with a stainless steel stirring assembly (a half-moon Teflon blade and a non pitched impeller). The reactor was also equipped with heating and cooling capability. 243 g AcAm solution (49.5%) was added to a 1000 mL flask followed by 0.20 g EDTA, 30.36 g DMAEM, 644.84 g distilled water. 6.70 g sulfuric acid was added to adjust the pH to ~7.0. This solution was transferred to the reactor and cooled to 15° C. 7.50 g Sodium persulfate (SPS) was dissolved in a beaker with 38 g of water and kept on the side. 5.0 g Sodium hypophosphite was dissolved in 12 g of water and placed in a syringe attached to a syringe pump. 1.40 g sulfuric acid was dissolved in 11 g distilled water and kept in a beaker. The reaction was initiated with the addition of SPS solution at once and at the same time started 2 ml/min addition Sodium hypophosphite from the syringe pumps. At the end of reaction (about 6 minutes) the acid solution was added to kill the reaction and stabilize the product.

Either process can be used in polymerization of co-monomers such as DMAPMA, DMAPAA, DMAEA with AcAm under similar batch or semi batch process.

Example 3

Synthesis of AcAm/DMAPMA Copolymer by Semi-batch Addition

A 250 mL resin flask equipped with a mechanical stirrer and a nitrogen inlet was charged with 78 grams deionized water containing 128 ppm EDTA. In separate beaker, a monomer solution comprised of 30 parts of 50 wt. % aqueous acrylamide and 4 parts DMAPMA were combined, and the resulting solution was purged with nitrogen for 30 minutes and then charged to a syringe. In a similar fashion, an initiator solution was prepared, by combining 4 parts water, 0.75 parts 50 wt. % sodium hydroxide, and 1.12 parts sodium persulfate, and placed in a syringe. A post-treat solution comprised of 0.5 parts sodium hypophosphite monohydrate dissolved in 2 parts water was also prepared.

The water in the reactor was stirred and purged with nitrogen for 20 minutes. Then a continuous feed of the monomer solution to the reactor was started, followed by the commencement of a continuous feed of the initiator solution. The monomer solution was fed at a rate of about 7 mL/hr, and the initiator solution was fed at a rate of about 0.5 mL/hr. The reaction viscosity was carefully monitored until it reached a point, after about 58 minutes, where mixing was difficult and the reactor contents began to pull away from the reactor walls. At this point, the pre-prepared post-treat solution was added immediately to the reaction. The viscosity decreased and the reactor contents were cooled and dispensed, providing a structured AcAm/DMAPMA (90/10) copolymer solution.

Example 4

Synthesis of Structured poly(DMAPAA) homopolymer

To a 100 mL resin flask was added 33 g water. Separately, a monomer and initiator solutions were prepared. The monomer solution was comprised of 10 g DMAPAA dissolved in 31.7 g water and adjusted to pH 9 with 4.83 g concentrated HCl. The initiator solution was comprised of 0.2 sodium persulfate dissolved in a mixture of 0.13 g 50% NaOH and 7 g water. Both solutions were added over 2 hours to the stirring, nitrogen-purged resin flask contents. The reactor contents were allowed to mix further for 1 hour and then treated with 1.5 g concentrated HCl and 0.05 g sodium persulfate. The product, comprised of an 11.3 wt. % solution of structured poly(DMAPAA) homopolymer.

Example 5

Synthesis using Pre-formed Polymer: AcAm/DADMAC/DMAPMA

In a 200 ml glass reactor equipped with a paddle stirrer, nitrogen purge tube, and condenser was mixed 16.5 g of a 30.1% aqueous solution of a DADMAC/DMAPMA backbone polymer and 70.2 g of DI water. The mole ratio of DADMAC to DMAPMA was 80:20. Acrylamide monomer, 10.3 g of a 49% aqueous solution, and diethylenetriaminepentaacetic acid pentasodium salt, 0.2 g of a 2% aqueous solution, were added to the backbone polymer solution. The pH of the resulting mixture was raised to 11 with NaOH. The solution was stirred at 200 rpm and purged with nitrogen for 30 minutes to remove all oxygen. Sodium persulfate, 2.4 g of a 5% aqueous solution, was added to the solution at 24° C. The reaction temperature gradually increased to 38° C. in 60 minutes as the polymerization progressed, and the solution became viscous. A warm water bath was used to hold the temperature between 40 and 45° C. for 3 hr. The polymerization of acrylamide reached 97% conversion.

Example 6

Example Using Pre-formed Polymer poly(amidoamine)

In a 200 ml glass reactor equipped with a paddle stirrer, nitrogen purge tube, and condenser was mixed a poly(amidoamine) backbone, 6.9 g of a 50% aqueous solution, and distilled (DI) water, 58.6 g. The poly(amidoamine) was made from adipic acid and diethylenetriamine. Acrylamide monomer, 23.6 g of a 49% aqueous solution, and diethylenetriaminepentaacetic acid pentasodium salt, 0.3 g of a 2% aqueous solution, were added to the backbone polymer solution. The pH of the resulting mixture was raised to 11 with Na$_2$CO$_3$. The solution was stirred at 200 rpm and purged with nitrogen for 30 minutes to remove all oxygen. Sodium persulfate, 9.66 g of a 20% aqueous solution, was added to the solution at 25° C. The reaction temperature increased to 55° C. in 5 minutes as the polymerization progressed, and the solution became viscous. A warm water bath was used to hold the temperature at about 50° C. for 5 hr. The polymerization of acrylamide reached 99.8% conversion. After cooling to 25° C. the pH was reduced to 7.1 with H$_2$SO$_4$.

Example 7

Sythesis of AcAm-free Poly(allylamines)

No acrylamide was used to synthesize this polymer. The polymer was made from a 72:23:5 mole ratio mixture of monoallylamine, diallylamine, and triallylamine using a thermally activated azo initiator at high temperature in water.

In a 500 ml glass reactor equipped with a paddle stirrer, nitrogen sparge tube, and condenser was mixed DI water, 76.8 g, and hydrochloric acid, 92.3 g of a 37% aqueous solution. After cooling the acid solution in an ice bath, a mixture of allylamine, 38.5 g, diallylamine, 20.9 g, and triallylamine, 6.4 g, was added dropwise to the acid. The temperature of the reactor contents was kept below 30° C. during this charging step. The monomer solution was then purged with nitrogen at 25-30° C. and a slurry of 2,2'-azobis[2-methyl-N-(2-hydroxyethyl)propionamide], 5.0 g in 10 g DI water, was added. The reactor contents were heated to 85° C. for 3 hr. After observing no viscosity increase, the reactor contents were further heated to 95° C. for 11 hr. The solution became very viscous. DI water, 84 g, was added before cooling to room temperature. The concentration of unreacted amines in this product were measured by gas chromatography. The conversions of the mono, di, and triallylamine to polymer were 45%, 83% and 94%, respectively. The concentration of the structured polyamine in this sample was 12.2%.

Comparative Example

Synthesis of Linear AcAm/DMAPMA Copolymer

The DMAPMA monomer (3.16 g), acrylamide monomer (24.34 g of a 50 wt. % solution), and water (56 g) were combined in a beaker and adjusted to pH 4 with concentrated HCl (about 1.95 g, representing a small molar excess over the amount of DMAPMA used). The reaction solution was charged to a 250 mL resin flask equipped with a mechanical stirrer and a nitrogen inlet, and then purged with nitrogen for 20 minutes. Sodium persulfate, 0.3 g, was added and the reaction was allowed to stir overnight. The reaction was then diluted with 10 g water and post-treated with a solution of 0.5 g sodium hypophosphite monohydrate dissolved in 1.5 g water. This provided a linear AcAm/DMAPMA solution polymer for comparative purposes.

Example 8

Comparison of Apparent Conformation Coefficients of Linear Polyacrylamide, Linear or Structured AcAm/DMAEM and AcAm/DMAPMA Copolymers Copolymers were synthesized under conditions for providing linear or structured AcAm copolymers. Evaluation of the apparent conformation coefficients in Table 1 indicates that the linear polymers (1* through 3*) have apparent coefficient values of greater than or equal to about 0.50 in contrast to non-linear structured copolymers (4* through 6 and 8 through 10**) with reduced values of about 0.25 to 0.30, which are consistent with polymer structuring. All structured polymers in Table 1 exhibited SEC column recovery greater than or equal to 80% solubility characteristic of water-soluble structured polymers described herein.

TABLE 1

Measured Properties of Linear vs. Structured (AcAm/DMAEM or AcAm/DMAPMA 90/10 mole

| Samples | Composition | $M_W$ by SEC/MALLS | SEC % Recovery | Conformation Coefficient |
|---|---|---|---|---|
| 1* | AcAm | 1300,000 | 100 | 0.57 |
| 2* | AcAm | 1900,000 | 100 | 0.59 |
| 3* | AcAm/DMAEM | 1200,000 | 80 | 0.50 |
| 4** | AcAm/DMAEM | 1100,000 | 100 | 0.25 |
| 5** | AcAm/DMAEM | 950,000 | 97 | 0.25 |
| 6** | AcAm/DMAEM | 1000,000 | 100 | 0.30 |
| 7$^b$ | AcAm/DMAEM | 28,000 | — | — |
| 8** | AcAm/DMAEM | 1100,000 | 100 | 0.29 |
| 9** | AcAm/DMAEM | 810,000 | 98 | 0.28 |
| 10** | AcAm/DMAPMA$^c$ | 1000,000 | 100 | 0.28 |

*linear;
**structured $^a$The apparent conformation coefficient was determined from the high MW polymer fraction, i.e. top 20% of the eluted polymers.
$^b$Was made by hydrolyzing sample 6.
$^c$Based on dn/dc of polyacrylamide.

It is evident that each structured acrylamide copolymer in Table 1 meet the parameters characterizing the polymers of the invention. Linear acrylamide polymers were prepared in the absence of conditions allowing controlled branching technique. Any polymerization process according to the prior art technique cannot provide a polymer having such a novel structure and excellent physical properties.

Example 9

Dry Strength Results Correlated to Apparent Conformation Coefficient

Dry Strength Testing Protocol:

Dry strength was evaluated using standard procedures for handsheet making and testing. The paper stock used and its treatment prior to sheet making are described as follows:

Stock used for Dry Strength Testing 52.0 liters thin stock at 1.0 wt %; 520 grams total fiber Fiber Composition: 80 wt % unrefined BHWK dry lap (CSF=560 mls)

20 wt % unrefined BSWK dry lap (CSF=750 mls)

Consistency: 1.01 wt % (measured)

Dilution Water: Naperville tap water, pH =7.9, conductivity 267 microS/cm

Stock Treatment Conditions for Dry Strength Testing

Dosing Volumes—2700 mls @ 1.0 wt % total volume to split into 5 500 mls/Sheet

Dosing Sequence

| time, sec | Event | 750 rpms with 2 turbine props, 2 in dia |
|---|---|---|
| 0 | Start | |
| 10 | Add strength Additive | |
| 130 | Add cationic retention aid | 2 min 10 sec |
| 150 | Stop and make Sheets | 2 min 30 sec |

Product Make Up

| Cationic retention aid | 0.169 wt % product | 4 ml = 0.5 lb/ton product for 2700 mls |
|---|---|---|
| Strength Additives | 0.675 wt % actives | 1 ml = 0.5 lb/ton actives for 2700 mls |

Handsheet making was conducted with a Noble & Woods handsheet former utilizing a single nip felted press and drum dried to bone dry conditions. Sheet strength was evaluated as tensile index, STFI, and burst ratio using TAPPI standard methods. Sheet (basis) weights and apparent sheet densities (calculated from caliper and basis weight) were evaluated as check on the sheet making procedure and to ensure that strength comparisons were made at equal apparent sheet densities.

A. Dry Strength Test Results for Selected AcAm Copolymers

As shown in Table 2, the structured polymers of this invention are superior to linear polymer (3*, Table 1) as well as commercial dry strength additives used in manufacturing of paper products. Use of these polymers allows for equivalent dry strength at lower polymer dose compared to currently available dry strength agents.

A common theme throughout all the strength tests is that the structured copolymers demonstrate excellent activity throughout. Clearly, those polymers in Table 1 exhibiting apparent conformation coefficients consistent with polymer structuring exhibit dry strength activity much greater than the linear polymer. Method of preparation enhanced activity for two copolymers. Both AcAm/DMAEM copolymers with semi-batch addition of chain transfer agent (8 & 9) and the AcAm/DMAPMA copolymer (10) were structured polymers which exhibited dry strength activity superior to a commercial dry strength agent. The two copolymers in which the CTA was added all at the beginning (4) did not show this enhanced activity, indicating that the semi-batch addition procedure is preferred at least for the AcAm/DMAEM copolymers.

TABLE 2

Summary of strength data from structured polymers of Table 1

| Samples | Dose lb/ton | Mean Tensile Index (Nm/g) | Mean STFI Index (klb$_f$-ft/lb) | Mean Burst Ratio (psi/lb/1000 ft$^2$) |
|---|---|---|---|---|
| None | 0 | 18.03 | 4.531 | 0.676 |
| Commercial agent | 4 | 20.44 | 5.031 | 0.989 |
| Commercial agent | 8 | 24.60 | 5.422 | 1.336 |
| 3 | 4 | 19.43 | 4.743 | 0.763 |
| 3 | 8 | 20.40 | 5.035 | 0.869 |
| 4 | 4 | 20.50 | 4.818 | 0.895 |
| 4 | 8 | 21.45 | 5.067 | 1.119 |
| 5 | 4 | 21.62 | 5.288 | 1.027 |
| 5 | 8 | 24.61 | 5.497 | 1.201 |
| 6 | 4 | 20.71 | 4.771 | 0.937 |
| 6 | 8 | 21.71 | 5.237 | 1.072 |
| 7 | 4 | 19.28 | 4.812 | 0.756 |
| 7 | 8 | 18.61 | 4.765 | 0.743 |
| 8 | 4 | 21.96 | 5.511 | 1.069 |
| 8 | 8 | 23.40 | 5.510 | 1.243 |
| 9 | 4 | 21.85 | 5.300 | 1.114 |
| 9 | 8 | 24.11 | 5.573 | 1.235 |
| 10 | 4 | 22.39 | 5.105 | 1.143 |
| 10 | 8 | 25.01 | 5.757 | 1.293 |

Each aqueous solution of an acrylamide structured polymer according to the present invention is, as shown in Table 2 have superior paper strength. These polymers are therefore economically excellent. When this polymer is used as a paper strength agent, it can exhibit comparable or better performance compared with conventional paper strength agents and is evidently excellent B. Dry Strength Activity for AcAm/DMAPMA and AcAm/DMAPAA Copolymers, AcAm/DMAPAA/MAA (monoallylamine) Terpolymer and a AcAm/DMAPMA/DMAPAA/MAA Tetrapolymer;

The polymers selected for the expanded evaluation are described in Table 3. The physical properties of these polymers are also reported in Table 3. Table 4 shows that all these polymers are good-performing polymers with apparent conformation coefficients consistent with polymer structuring, i.e. <0.40. Activity comparisons are made with commercial strength agents in Table 4, which were shown to be more active than linear polymers in Table 2. Additionally, all the SEC recoveries were high indicating good solubility.

TABLE 3

Structured Acrylamide Polymer Descriptions

| Sample | Composition mole ratio | Polymer Conc. wt % | M$_W$ by SEC/MALLS$^a$ | SEC % recovery$^a$ | Conformation Coefficient$^a$ |
|---|---|---|---|---|---|
| 11 | AcAm/DMAPAA/MAA, 88/10/2 | 14.3 | 1300,000 | 98 | 0.30 |
| 12 | AcAm/DMAPMA/DMAPAA/MAA, 88/5/5/2 | 15 | 2000,000 | 100 | 0.28 |
| 13 | AcAm/DMAPAA, 90/10 | 15 | 1300,000 | 100 | 0.37 |
| 14 | AcAm/DMAPMA 90/10 | 15 | 1100,000 | 100 | 0.32 |

$^a$based on dn/dc of polyacrylamide

TABLE 4

Tensile Index, STIFI Index and Burst Ratio data for Structured Acrylamide Polymers

| Dose, lb/ton | Commercial agent | 11 | 12 | 13 | 14 |
|---|---|---|---|---|---|
| Absolute Tensile Index (Nm/g) | | | | | |
| 0 | 21.20 | 21.20 | 21.20 | 21.20 | 21.20 |
| 2 | 23.43 | 25.27 | 24.54 | 26.49 | 25.50 |
| 4 | 25.13 | 29.57 | 28.91 | 27.46 | 27.96 |
| 6 | 27.42 | 28.68 | 28.71 | 29.66 | 28.60 |
| 8 | 31.47 | 29.79 | 32.54 | 31.92 | 36.04 |
| Absolute STFI Index (klb$_f$-ft/lb) | | | | | |
| 0 | 5.21 | 5.21 | 5.21 | 5.21 | 5.21 |
| 2 | 5.49 | 5.68 | 5.65 | 5.53 | 5.70 |
| 4 | 5.50 | 6.34 | 6.55 | 6.26 | 6.12 |
| 6 | 5.93 | 6.23 | 6.32 | 6.50 | 6.19 |
| 8 | 6.24 | 6.42 | 6.56 | 6.62 | 6.78 |
| Absolute Burst Ratio (psi/lb/1000 ft$^2$) | | | | | |
| 0 | 0.77 | 0.77 | 0.77 | 0.77 | 0.77 |
| 2 | 0.94 | 1.09 | 1.17 | 1.15 | 1.13 |
| 4 | 1.02 | 1.21 | 1.38 | 1.35 | 1.34 |
| 6 | 1.20 | 1.44 | 1.57 | 1.51 | 1.31 |
| 8 | 1.20 | 1.51 | 1.58 | 1.57 | 1.31 |

C. Dry Strength Activity of AcAm Grafted DADMAC/DMAPMA Copolymers of Example 5

Dry strength results of structured polymers characterized in Table 5 are presented in Table 6. inspection of Table 6 indicates the DADMAC/DMAPMA grafted with AcAin polymer (21) provides relative dry strength activity compared to commercial agent, which in turn was shown to provide greater dry strength activity than unstructured linear acrylamide polymers. The structured polymers of the type previously described (15-20) again demonstrated good dry strength activity, and the best activity was observed with these types of polymers. These data show that structuring can be achieved starting with amine containing polymers as well as with amine containing monomer.

TABLE 5

Structured Amine-Containing Acrylamide Polymers

| Sample | Composition mole ratio | Polymer Conc., wt % | $M_W$ by SEC/MALLS[a] | SEC % recovery[a] | Conformation Coefficient[a] |
|---|---|---|---|---|---|
| 15 | AcAm/DMAPMA 90/10 | 15 | 1300,000 | 100 | 0.29 |
| 16 | AcAm/DMAPMA 90/10 | 15 | 660,000 | 100 | 0.38 |
| 17 | AcAm/DMAPMA 95/5 | 15 | 1200,000 | 100 | 0.27 |
| 18 | AcAm/DMAEM 90/10 | 15 | 1100,000 | 100 | 0.30 |
| 19 | AcAm/DMAPMA/DMAEM, 90/5/5 | 15 | 1000,000 | 100 | 0.33 |
| 20 | AcAm/DMAPAA 90/10 | 15 | 1300,000 | 100 | 0.37 |
| 21 | AcAm/DADMAC/DMAPMA 70/24/6 | 10 | 1900,000 | 94 | 0.30 |

[a]based on dn/dc of polyacrylamide

TABLE 6

Tensile Index, STFI Index, Burst Ratio Strength Data for Structured AcAm Polymer in Table 5

| Treatment | Dose lb/ton | Ave Tensile Index | Ave STFI Index | Ave Burst ratio |
|---|---|---|---|---|
| None | 0 | 19.42 | 4.925 | 0.717 |
| Commercial agent | 4 | 22.16 | 5.491 | 0.949 |
| 21 | 4 | 23.65 | 5.646 | 1.098 |
| 15 | 4 | 20.40 | 5.242 | 0.838 |
| 16 | 4 | 23.72 | 5.443 | 0.965 |
| 18 | 4 | 23.98 | 5.568 | 0.996 |
| 17 | 4 | 24.01 | 5.465 | 1.003 |
| 19 | 4 | 24.41 | 5.774 | 1.112 |
| 20 | 4 | 25.89 | 5.840 | 1.146 |
| Commercial agent | 8 | 25.82 | 5.822 | 1.317 |
| 21 | 8 | 24.30 | 5.963 | 1.390 |
| 15 | 8 | 23.20 | 5.679 | 1.044 |
| 16 | 8 | 24.10 | 5.521 | 1.163 |
| 18 | 8 | 28.04 | 6.138 | 1.166 |
| 17 | 8 | 25.91 | 5.833 | 1.223 |
| 19 | 8 | 28.18 | 6.266 | 1.280 |
| 20 | 8 | 28.26 | 6.213 | 1.281 |

D. Dry Strength Activity of Structured Amine Polymer Prepared from monoallylamine, diallylamine, and triallylamine Mixture.

The polymers in Table 7 were evaluated for their dry strength activity in the same way as previously described except that bleached kraft fiber refined in a Valley Beater to 360 mls CSF (Canadian Standard Freeness) was used.

TABLE 7

Polymers Evaluated in Refined Bleached Kraft Pulp

| Sample | Composition | Polymer Conc., wt % |
|---|---|---|
| 22 | MAA/DAA/TAA Initial Monomer: 72/23/5 mole Monomer Conversion, %: 45/83/94 Polymer composition: 57.6/34/8.4 mole | 12.2 |
| 23 | 90/10 mole ratio AcAm/DMAPMA | 15.0 |

The dry strength results are shown in Table 8. As expected based on earlier results, the branched AcAm/DMAPMA copolymer (23) performs very well and demonstrates dry strength activity much greater than the two commercial products. The polyallylamine polymer (22) also was found to have the same enhanced activity as structured polymer (23).

TABLE 8

Tensile Index, STFI Index, Burst Ratio strength data for polymer in Table 7

| Dose, lb/ton | Commercial agent | 22 | 23 |
|---|---|---|---|
| Tensile Index (Nm/g) | | | |
| 0 | 47.85 | 47.85 | 47.85 |
| 3 | 42.44 | 56.61 | 47.11 |
| 6 | 43.86 | 63.07 | 52.56 |
| 9 | 48.59 | 56.09 | 48.22 |
| STFI Index (klb$_f$-ft/lb) | | | |
| 0 | 9.412 | 9.412 | 9.412 |
| 3 | 9.379 | 9.645 | 9.598 |
| 6 | 9.443 | 9.949 | 10.066 |
| 9 | 9.742 | 9.816 | 9.751 |
| Burst Ratio (psi/lb/1000 ft$^2$) | | | |
| 0 | 2.796 | 2.796 | 2.796 |
| 3 | 3.021 | 3.351 | 3.362 |
| 6 | 3.287 | 3.585 | 3.505 |
| 9 | 3.563 | 3.643 | 3.672 |

The data shown in Tables 2-8 exemplify the paper strength agent activity (burst index, Tensile Index and STFI) as identified by the parameters set fort in the present invention.

That which is claimed:

1. A water-soluble structured polymer having a weight-average molecular weight of from about 100,000 to about 5,000,000; an apparent conformation coefficient of less than or equal to about 0.40 in sodium nitrate solution having a pH of about 3; and a greater than or equal to about 80% solubility as determined by SEC/MALLS which comprises the polymerization reaction product of:
   a. acrylamide; and
   b. one of dimethylaminoethyl methacrylate, dimethylaminopropyl acrylamide and dimethylaminopropyl methacrylamide,
wherein the aqueous polymerization reaction employs a redox reaction between the amine groups of monomers a) and b) and an oxidizing initiator and wherein the polymerization reaction is conducted at a pH greater than or equal to 6 and a temperature below about 60° C. in the absence of a crosslinking agent and wherein the polymer was produced in the absence of a cross-linking agent.

2. The structured polymer of claim 1, wherein the solubility is equal to or greater than about 90% as determined by SEC/MALLS.

3. The structured polymer of claim 1, wherein the structured polymer is characterized by a weight-average molecular weight of from about 100,000 to about 3,000,000.

4. The structured polymer of claim 1, wherein the polymer is characterized by a weight-average molecular weight of from about 500,000 to about 2,000,000.

5. A process for improving the internal dry strength of paper comprising treating an aqueous suspension of papermaking fibers with an effective dry strength enhancing amount of a structured polymer according to claim 1.

6. The process of claim 5 wherein the effective amount of the polymer ranges from about 0.1 lb to about 30 lb of said polymer per ton of finished paper.

7. The process of claim 5 wherein the effective amount of said polymer ranges from about 0.5 lb to about 20 lb of said polymer per ton of finished paper.

8. The process of claim 5 wherein the effective amount of said polymer ranges from about 0.5 lb to about 6 lb of said polymer per ton of finished paper.

* * * * *